United States Patent [19]

Badessa

[11] 3,733,137
[45] May 15, 1973

[54] LOG RATIO TRANSMITTANCE SIGNAL PROCESSOR FOR PHOTOMETRIC APPARATUS

[76] Inventor: Rosario S. Badessa, c/o Damon Corp. 115 Fourth Ave., Needham Heights, Mass. 02194

[22] Filed: Jan. 12, 1971

[21] Appl. No.: 105,802

[52] U.S. Cl..............356/204, 324/111, 324/140 D, 356/93
[51] Int. Cl............................G01n 21/22, G01j 3/42
[58] Field of Search......................324/140 D, 140 R, 324/111; 356/205, 204, 206, 93; 250/218

[56] References Cited

UNITED STATES PATENTS 3,528,749 9/1970 Bowker................................356/204
3,566,133 2/1971 Dorman et al.......................356/205

Primary Examiner—Ronald L. Wibert
Assistant Examiner—V. P. McGraw
Attorney—Kenway, Jenney & Hildreth

[57] ABSTRACT

The processor described herein operates to provide an output signal which varies as a function of the logarithm of the ratio of two input signals. In the processor, the charge on a capacitor is controlled to provide an exponential waveform which starts at a level proportional to one of the input signals. Preferably, the exponential is positive, i.e., regenerative rather than degenerative. A squarewave pulse is initiated simultaneously with the starting of the exponential waveform. When the exponential waveform reaches a level proportional to the other of the input signals, this squarewave pulse is terminated. By repetitively generating squarewave pulses in this manner, a pulse train output signal is obtained having an average amplitude or d.c. component which is proportional to the logarithm of the ratio between the two input signals.

4 Claims, 1 Drawing Figure

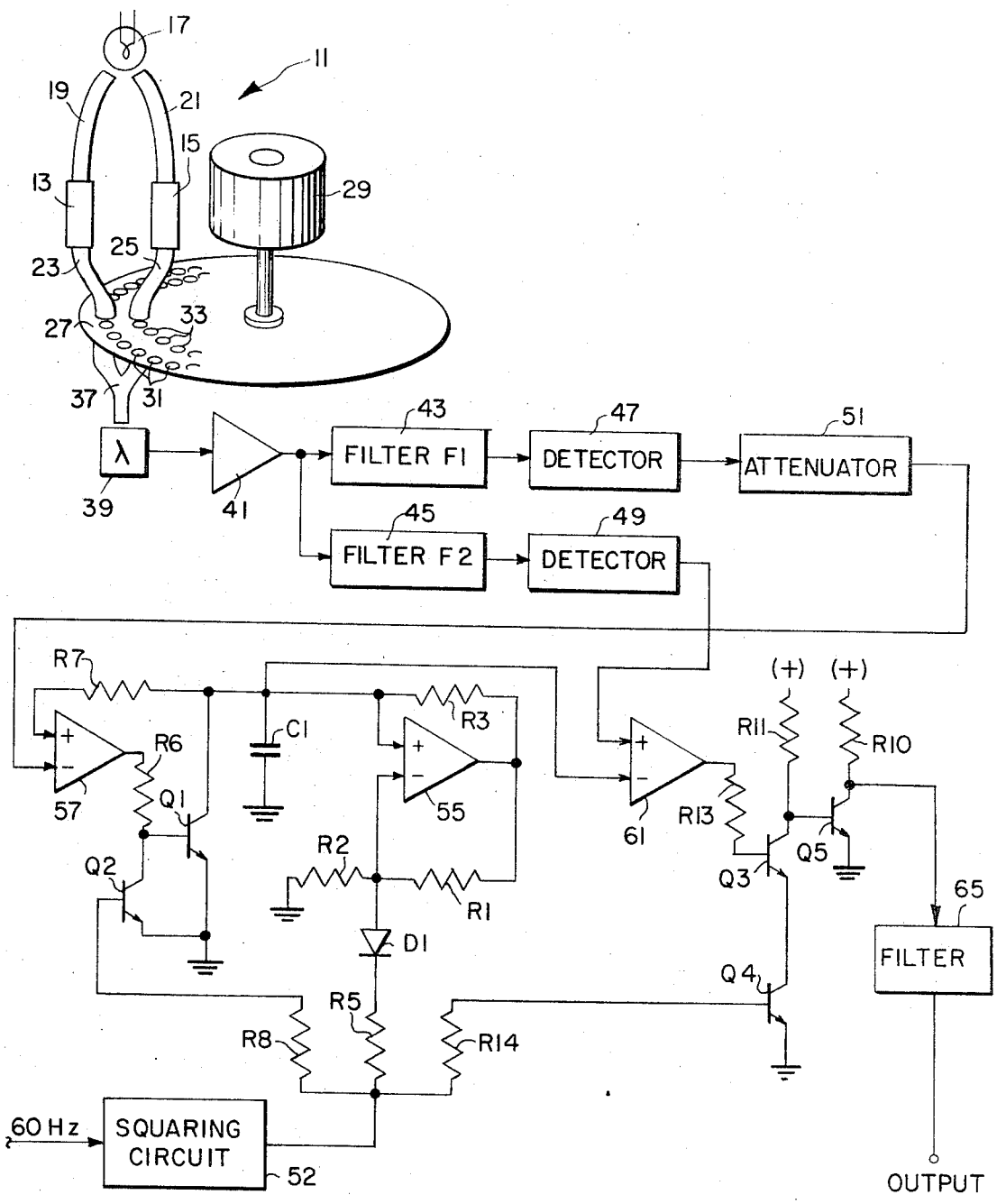

LOG RATIO TRANSMITTANCE SIGNAL PROCESSOR FOR PHOTOMETRIC APPARATUS

BACKGROUND OF THE INVENTION

This invention relates to a log ratio signal processor and more particularly to such a processor useful in colorimetric chemical analysis.

In absorption colorimetry, it is common practice to measure the absorption of a chemical constituent by comparing the transmittance of a sample cell or cuvette, containing the sample, with the transmittance of a reference cell which is identical to the sample cell, except for the omission of the sample constituent sought to be measured. This process tends to cancel or offset absorption components which are due to absorbing materials other than the constituent sought to be measured. As is understood by those skilled in the art, the absorption due to the sought constituent is a function of the logarithm of the ratio of the transmittance of the reference cell to the transmittance of the sample cell.

It has been known heretofore that a logarithmic conversion can be obtained using the exponential decay function waveform of a discharging capacitor having a predetermined time constant. Such a predetermined waveform is repetitively generated and is compared with the input signal which is to be converted. A squarewave pulse is initiated when the predetermined waveform voltage equals the input signal voltage and is terminated when the next cycle is begun.

It has also been known that a log ratio signal indicating the relationship between two input signals can be generated by using two thresholds, one corresponding to each of the input signals, and by generating a squarewave pulse during the time the voltage of the predetermined exponential waveform is between the two threshold levels. The average d.c. voltage of the squarewave pulse train thereby generated is then a function of the log ratio of the two input signals. A system of this type is described in a paper by J. F. W. Mallett and R. P. Phizackerley entitled A Logarithmic Analogue-to-Digital Converter Used For Optical Density Measurements which was published in the Journal of Physics E: Scientific Instruments 1970 Vol. 3 (Great Britain). Related systems are disclosed in U.S. Pat. No. 3,459,948 issued Aug. 5, 1969 to Gino Cosci and British Pat. No. 696,213 which discloses the invention of Philip Vanderlyn. In this above-described prior art type of processor, however, a substantial portion of the duty cycle of the apparatus may be spent in traversing essentially unused portions of the logarithmic waveform and the range and accuracy of the instrument may be adversely affected thereby.

Among the several objects of the present invention may be noted the provision of a signal processor which will provide an output signal which is proportional to the log ratio of two input signals; the provision of such a processor which provides a high degree of accuracy; the provision of such an apparatus which has a substantial dynamic range; the provision of such an apparatus which has an efficient duty cycle; the provision of such apparatus which is reliable and which is relatively simple and inexpensive. Other objects and features will be in part apparent and in part pointed out hereinafter.

SUMMARY OF THE INVENTION

Briefly, apparatus according to the present invention is operative to generate a signal which varies as a function of the logarithm of the ratio of two input signals. Feedback controlled means are provided for setting the voltage on a timing capacitor to an initial value which is proportional to the amplitude of one of the input signals and then releasing control of the capacitor charging. The charge on the capacitor is then controlled to generate a voltage waveform which varies as an exponential function of time, starting from the initial value. A comparator circuit detects when the capacitor waveform reaches a threshold level which is proportional to the amplitude of the other of the input signals. The initial voltage-setting means and the waveform-generating means are controlled to provide alternating operation at a substantially constant frequency. A train of squarewave pulses are generated under the control of the comparator circuit, each pulse being initiated when the control of capacitor charging is released by the initial voltage-setting means and being terminated when the capacitor waveform reaches the threshold level. Accordingly, the average d.c. voltage of the squarewave pulse train generated will be a function of the logarithm of the ratio of the two input signals.

BRIEF DESCRIPTION OF THE DRAWING

The single drawing is a somewhat schematic block diagram of photometric apparatus employing a signal processor according to the present invention.

Referring now to the drawing, a comparison colorimeter 11 is illustrated in very diagrammatic form. A more complete disclosure of a colorimeter of this type is contained in the commonly assigned and copending application of Lawrence C. Bonar, Leo Blumley and Andres Ferrari for Multiple Photometer assembly which is being filed on the same day as the present application. Colorimeter 11 is adapted for use in the colormetric analysis of fluids, e.g., blood, and comprises a sample cell 13 and a reference cell 15. The embodiment illustrated was designed for incorporation in an automatic blood analysis system of the type disclosed in the commonly assigned and copending application of David I. Kosowsky, C. Hurtig and Andres Ferrari for Constituents-Measuring Chemical Analyzer Having Multiple Concurrently-Operated Aliquot-Processing Conveyors which is being filed on the same day as the present application.

Radiation from a common source 17 is applied to the cells 13 and 15 through respective light pipes 19 and 21. While the radiation employed is described as light in the specification for simplification of the explanation, it should be understood that ultraviolet or infrared radiation may be used as well as visible light. Light transmitted through each of the cells of 13 and 15 is coupled, through respective light pipes 23 and 25, to one face of an optical chopping disc 27.

Disc 27 is rotated at a predetermined angular velocity by a motor 29. Disc 27 is perforated in conventional manner so as to provide a first circular array of apertures 31 and a second circular array of apertures 33, concentric therewith. The light pipe 23 is positioned so that the optical signal carried thereby is chopped by the apertures 31 while the light pipe 25 is positioned so that its optical signal is chopped by the apertures 33. The two circular arrays comprise different numbers of apertures so that the different chopping rates are applied to the two optical channels. In the embodiment illustrated, the number of apertures were selected, in relation to the speed of the motor 29, so that the reference cell light path was chopped at a frequency of 390 Hz, and the sample cell light path was chopped at a rate of 690 Hz. The chopped light signals thereby provided on the opposite face of the disc 27 are combined in a light pipe wye 37, and the combined radiation is applied to a detector 39.

The a.c. signal obtained from detector 39 is amplified, as indicated at 41 and the amplified signal is applied to a pair of tuned filters 43 and 45, each filter being tuned to a respective one of the optical chopping frequency. The filters 43 and 45 operate to separate the two signals which were previously combined optically so that they could be received up by a common detector. The use of such a common detector is preferred in that errors due to mis-matching of detectors are avoided. The separated a.c. signals obtained from the tuned filters 43 and 45 are applied to respective rectifiers or detectors 47 and 49 to obtain d.c. voltages which are proportional to the respective a.c. signals.

As will be understood by those skilled in the art, the d.c. signals or voltages thereby obtained from the detectors 47 and 49 will be essentially proportional to the transmittances of the sample and reference cells, 13 and 15 respectively. These d.c. signals thus represent the quantities of which it is desired to obtain the log ratio. As the transmittance of the reference cell will typically be greater than that of the sample cell 13, the output signal from the detector 47 will thus likewise be of greater amplitude than the output signal from the detector 49. For reasons which will be more apparent hereinafter, the operation of the signal processor in the embodiment illustrated is based upon the use of a reference signal which is always smaller than the sample signal. The reference is thus attenuated by a constant factor as indicated at 51. Since the output signal being generated by the signal processor is proportional to the logarithm of the ratio of the two input signals, it will be understood by those skilled in the art that this factoring of one of the signals by a constant attenuation factor will introduce only a fixed offset in the amplitude of the output signal, which offset may be easily compensated for in the read-out or evaluation of the processor output signal.

As is explained hereinafter, the signal processor itself operates in a repetitive cycle. To obtain a switching signal suitable for controlling the sequential or alternating operation of various portions of the circuitry, a constant frequency timing signal e.g. a 60 Hz sine wave obtained from conventional power mains, is applied to a squaring circuit 52 to obtain a squarewave timing signal having a duty cycle which is approximately 50 percent positive and 50 percent negative.

As noted previously, the apparatus of the present invention utilizes an exponential waveform which is generated across a timing capacitor. This timing capacitor is indicated at C1. Preferably, the waveform generated across capacitor C1 is a positive exponential function of time, i.e., regenerative rather than degenerative. In the embodiment illustrated, such a regenerative waveform is obtained by providing positive feedback around an operational amplifier 55. Suitable positive and negative supply sources are provided for the various amplifiers used, though not shown in the drawing. The gain of amplifier 55 is stablized to a preselected value by means of resistors R1 and R2 which form a voltage dividing network providing negative feedback from the output terminal of amplifier 55 to its negative or inverting input terminal. The positive feedback necessary to obtain a waveform having positive exponential characteristics is provided by means of a resistor R3 which connects the output terminal of amplifier 55 to its non-inverting input terminal, the capacitor C1 being connected to this terminal also. As will be understood by those skilled in the art, the amplifier circuit described thus far will operate to generate across capacitor C1 an exponential waveform having a positive exponent, the time constant being determined by the values of resistor R3 and capacitor C1, together with the effective gain of the amplifier 55. As is explained in greater detail hereinafter, the waveform generating circuitry operates during the positive portions of the squarewave timing signal.

Rather than have the repetitively generated exponential waveform start from some arbitrary or predetermined level, the apparatus illustrated controls the starting point so that it is a precisely predetermined function of the amplitude of the reference signal. This presetting of the timing capacitor voltage occurs during the negative portions of these squarewave timing signal. During these same periods the waveform generating circuitry is effectively disabled. The squarewave timing signal is coupled to the inverting input terminal of amplifier 55 through a diode D1 and a current limiting resistor R5. Thus, during the negative portions of the squarewave timing signal, the diode is forward biased. The value of resistor R5 is selected so that the amplifier 55 is thrown into saturation, irrespective of the various feedback currents, with the output signal of the amplifier 55 being driven essentially to the positive supply voltage.

During the presetting operation, the voltage across capacitor C1 is controlled by means of an operational amplifier 57 in conjunction with a transistor Q1 which functions as an inverter. The collector-emitter circuit of transistor Q1 is connected across the timing capacitor C1. However, during the generation of the exponential waveform, transistor Q1 is prevented from loading the capacitor C1 and the amplifier 55 by a transistor Q2 which shunts the base-emitter circuit of transistor Q1 and which keeps that latter transistor from being turned on during the positive portions of the squarewave timing signal, the timing signal being applied to the base of transistor Q2 through a current-limiting resistor R8. During the negative portions of the squarewave timing signal on the other hand, transistor Q1 is in effect enabled, since the transistor Q2 is turned off, and is thus free to control the voltage across the capacitor.

The attenuated reference signal is applied to the inverting input terminal of operational amplifier 57 while the voltage on the timing capacitor C1 is applied to the non-inverting input terminal. This latter voltage is applied to the amplifier through an isolating resistor R7 which prevents any significant loading of the amplifier 55 during generation of the exponential waveform. The output signal from the operational amplifier 57 is applied to transistor Q1 through a current-limiting resistor R6.

The negative portions of the squarewave timing signal cause the amplifier 55 to be driven into saturation with its output voltage being positive. Thus, current is available to the collector circuit of transistor Q1 through the resistor R3. In this mode of operation, the resistor R3 in effect acts as the collector load resistor for transistor Q1 as it controls the voltage across capacitor C1. As the transistor Q1 operates as a signal inverter, the application of the capacitor voltage to the non-inverting input terminal of operational amplifier 57 is in fact negative feedback. It can thus be seen that a servo loop is formed which operates to automatically adjust, by feedback control, the voltage on capacitor C1 to a level quite precisely equal to the value of the attenuated reference signal. In this manner, the capacitor voltage is precisely preset to an initial value of which is a function of the amplitude of the reference signal, during the negative portions of the squarewave timing signal.

At the end of each negative portion of the squarewave timing signal, control of the charging of capacitor C1 is effectively completely released by the presetting circuit. As noted previously, transistor Q1 is turned off by transistor Q2. Further, there is no collector load resistor for transistor Q1 apart from the resistor R3 and this resistor is an intrinsic part of the circuitry which generates the exponential waveform.

The voltage on capacitor C1 is also applied to the inverting input terminal of a comparator amplifier 61. The sample signal, obtained from the filter 45 and detector 49, is supplied to the non-inverting input terminal of amplifier 61. Accordingly, the output signal from amplifier 61 will be positive when the capacitor voltage is lower than the sample signal voltage but will switch to a negative potential when the capacitor voltage reaches the sample signal voltage.

The collector-emitter circuits of a pair of NPN transistors Q3 and Q4 are connected in series across the base-emitter circuit of an NPN transistor Q5 so as to form, in conventional manner, an AND gate for controlling conduction through the collector-emitter circuit of transistor Q5. Transistor Q5 is provided with a load-resistor R10 connected to a suitable constant-voltage positive source and is normally biased into conduction by current provided through a resistor R11. However, as will be understood, transistor Q5 may be turned off by the shunting action of transistors Q3 and Q4 when both of those transistors are biased into conduction. The output signal from comparator amplifier 61 is applied, through a resistor R13, so as to control the conduction through transistor Q3 while conduction through transistor Q4 is controlled by the squarewave timing signal applied, through a current limiting resistor R14, to the base of that transistor.

Since conduction through the transistor Q4 is controlled by the squarewave timing signal, it can be seen that transistor Q5 can be turned off only during the positive portions of the squarewave timing signals. However, assuming that the capacitor voltage is less than the sample signal voltage so that the transistor Q3 is biased on, transistor Q5 will be turned off at the start of the positive portion of the timing signal. At this time, the voltage at the collector of transistor Q5 will then go positive.

Assuming that the time constant of the exponential charging circuit is appropriately chosen, the voltage on capacitor C1 will reach the level of the sample signal within the positive portion of the timing signal. When this happens, comparator amplifier 61 turns off transistor Q3 which, in turn permits the transistor Q5 to again conduct. The voltage at the collector of transistor Q5 will thus again be pulled back, essentially to ground.

As the squarewave timing signal causes the capacitor voltage presetting circuitry and the exponential waveform generating circuitry to operate alternately, it will be seen that the voltage at the collector of transistor Q5 will comprise a succession or train of squarewave pulses, the start of each such squarewave pulse being coincident with the positive-going transition of the timing signal and thus occurring at a fixed phase with reference to the repetitive control cycle. It will further be seen that the duration of each pulse at the collector of transistor Q5 will depend upon the relative amplitudes of the attenuated reference signal and the sample signal voltage, the former determining the initial capacitor voltage and the latter determining the threshold level at which the exponentially rising capacitor voltage will terminate each squarewave pulse. Since the waveform of the voltage generated across capacitor C1 is exponential in nature, the duration of each pulse is logarithmicaly related to the voltage levels and it can be shown mathematically that the duration is, in effect, a function of the logarithm of the ratio of the reference signal to the sample signal amplitude. As the squarewave pulses generated at the collector of transistor Q5 occur at a constant frequency, the average or d.c. level of this signal will be proportional to the pulse width or duration of each pulse. A d.c. signal equal to this average voltage is obtained by means of a low pass filter 65. If desired, this d.c. level can be inverted to obtain a negative voltage. Owing to the characteristic of the logarithmic conversion, it will be seen that this is equivalent to having obtained the logarithm of the inverse ratio. As the information desired can be abstracted from the output signal whether the ratio is inverse or original or even in the presence of constant offset or scale factors, it should be understood that the claims should be understood to cover such equivalents as well as the particular embodiment illustrated. Likewise, the roles of the two input signals may be reversed.

Since the voltage on the timing capacitor is precisely preset under feedback control, it can be seen that a relatively efficient operating cycle is obtained, that is, no time is spent traversing an unused portion of a fixed waveform before the timing interval is initiated. Further, since the embodiment illustrated employs an exponential waveform in which the exponent is positive, the rate of change of capacitor voltage increases progressively during the timing interval. Thus, the threshold detection occurs when the rate of change is relatively high as compared with the initial rate. Accordingly, quite precise timing accuracy is obtained. Further, only a single threshold detector is needed.

In view of the foregoing, it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

What is claimed is:

1. Apparatus for generating a signal which varies as a function of the logarithm of the ratio of two input signals, said apparatus comprising:
   a capacitor;
   voltage control means for setting the voltage on said capacitor under feedback control to an initial value which is proportional to the amplitude of one of said input signals and then releasing control of the capacitor charging;

means, including an amplifier and a resistance interconnected with said amplifier to provide positive feedback, for varying the charge on said capacitor after release by said voltage control means to generate a voltage waveform which, starting from said initial value, varies as an exponential function of time, the exponent being positive;

a comparator circuit for detecting when the capacitor waveform reaches a threshold level which is proportional to the amplitude of the other of said input signals;

means for enabling said voltage control means and said waveform generating means alternately for repetitive alternate operation at a substantially constant frequency;

means controlled by said comparator circuit for generating a train of squarewave pulses of substantially constant amplitude, each pulse being initiated when control of capacitor charging is released by said initial voltage setting means and being terminated when the capacitor waveform reaches said threshold level, the average d.c. voltage of said squarewave pulse train being a function of the logarithm of the ratio of said input signals.

2. Photometric apparatus for measuring the absorption of a sample material, said apparatus comprising:

a sample cell for receiving said sample material;
a reference cell essentially similar to said sample cell;
means for transmitting radiation from a common source through each of said cells;
means for chopping the radiation passing through said sample cell at a first frequency and for chopping the radiation passing through said reference cell at a second frequency;
a radiation detector;
means for combining the chopped radiation components from both cells and applying the combined radiation to said radiation detector;
means for filtering the signal obtained from said radiation detector to separate the a.c. components corresponding to the chopped radiation components obtained from the respective cells;
means for detecting said a.c. components to obtain a pair of transmittance signals;
a capacitor;
voltage control means for setting the voltage on said capacitor to an initial value which is proportional to the level of one of said transmittance signals and then releasing control of the capacitor charging;
means for varying the charge on said capacitor after release by said voltage control means to generate a voltage waveform which, starting from said initial value, varies as an exponential function of time, the exponent being positive;
a comparator circuit for detecting when the capacitor wave-form reaches a threshold level proportional to the level of the other of said transmittance signals;
timing means for enabling said initial voltage control means and said waveform generating means alternately to provide repetitive alternate operation at a substantially constant frequency;
means controlled by said comparator circuit and said timing means for generating a train of squarewave pulses of substantially constant amplitude, one edge of each pulse occurring at a fixed phase in the controlled timing cycle and the other edge occurring when the capacitor waveform reaches the level of said other transmittance signal, the average d.c. voltage of said squarewave pulse train being a function of the logarithm of the ratio of said transmittance signals.

3. Apparatus as set forth in claim 2 wherein said charge controlling means includes an amplifier and a resistance interconnected with said amplifier for providing positive feedback thereby to generate across said capacitor, an exponential waveform having a positive exponent.

4. Photometric apparatus for measuring the absorption of a sample material, said apparatus comprising:

a sample cell for receiving said sample material;
a reference cell essentially similar to said sample cell;
means for transmitting radiation from a common source through each of said cells;
means for chopping the radiation passing through said sample cell at a first frequency and for chopping the radiation passing through said reference cell at a second frequency;
a radiation detector;
means for combining the chopped radiation components from both cell and applying the combined radiation to said radiation detector;
means for filtering the signal obtained from said radiation detector to separate the a.c. components corresponding to the chopped radiation components obtained from the respective cells;
means for detecting said a.c. components to obtain, respectively, a sample transmittance signal and a reference transmittance signal;
means for attenuating said reference transmittance signal level to a value below the range of expected sample signal levels;
a capacitor;
voltage control means for setting the voltage on said capacitor to an initial value which is equal to the level of said attenuated reference signal and then releasing control of the capacitor charging;
means, including an amplifier and a resistance interconnected with said amplifier for providing regenerative feedback, for varying the charge on said capacitor after release by said voltage control means to generate a voltage waveform which, starting from said initial value, varies as an exponential function of time, the exponent being positive;
a comparator circuit for detecting when the capacitor waveform reaches the level of said sample signal;
timing means for enabling said initial voltage setting means and said waveform generating means alternately to provide repetitive alternate operation at a substantially constant frequency;
means controlled by said comparator circuit and said timing means for generating a train of squarewave pulses of substantially constant amplitude, each pulse being initiated when control of capacitor charging is released by said initial voltage setting means and being terminated when the capacitor waveform reaches the level of said sample signal, the average d.c. voltage of said squarewave pulse train being a function of the logarithm of the ratio of said transmittance signals.

* * * * *